(12) United States Patent
Thomas et al.

(10) Patent No.: US 6,901,415 B2
(45) Date of Patent: May 31, 2005

(54) METHOD AND SYSTEM FOR PROCESSING NOTIFICATIONS

(75) Inventors: Edward Eric Thomas, Redmond, WA (US); Stephen D. Flanagin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 09/892,678

(22) Filed: Jun. 27, 2001

(65) Prior Publication Data

US 2003/0004917 A1 Jan. 2, 2003

(51) Int. Cl.[7] ............................................. G06F 17/00
(52) U.S. Cl. ...................................................... 707/203
(58) Field of Search ........................... 707/102, 3, 204, 707/213; 714/13

(56) References Cited

U.S. PATENT DOCUMENTS

| | | | | |
|---|---|---|---|---|
| 4,853,843 A | * | 8/1989 | Ecklund | 707/203 |
| 5,224,212 A | * | 6/1993 | Rosenthal et al. | 710/53 |
| 6,134,673 A | * | 10/2000 | Chrabaszcz | 714/13 |
| 6,553,409 B1 | * | 4/2003 | Zhang et al. | 709/213 |

* cited by examiner

Primary Examiner—Alford Kindred
Assistant Examiner—Sana Al-Hashemi
(74) Attorney, Agent, or Firm—Merchant & Gould PC

(57) ABSTRACT

A method and system for processing notifications is described. Notifications are tagged based on a synchronization state between the sender and receiver of the notification. The receiver processes the tagged notification based on a comparison between the tagged value and the current state of its synchronization with respect to the sender of the notification. When the tagged value is current with respect to the current synchronization value and a synchronization is not in process, the notification is processed. When the tagged value is stale with respect to the current synchronization state the notification is discarded. If the notification is out-of-date with respect to the current state of synchronization the notification may be queued for later processing or discarded.

15 Claims, 8 Drawing Sheets

METHOD AND SYSTEM FOR PROCESSING NOTIFICATIONS

FIELD OF THE INVENTION

The present invention relates generally to computer software, and more particularly to processing notifications on a device.

BACKGROUND OF THE INVENTION

There are situations where users want a data store in one place to be a copy of a data store in another place. In order to propagate changes made in one store to another, synchronization methods have been developed to propagate the changes between the different stores, so that the information in the different stores correlate to each other at discrete times, or checkpoints. Another method has changes being transferred discretely at the time of change by exchanging notifications. Some devices employ both methods of keeping their data store in synchronization, but encounter problems when notification delivery is delayed and said delayed notification arrives after a synchronization of that change has already been performed.

For example, some devices receive notifications that are not current with the current synchronization checkpoint between the devices. This may result in notifications being improperly processed.

SUMMARY OF THE INVENTION

The present invention is directed at providing a system and method for processing notifications. Briefly described, before being sent, notifications are tagged with a synchronization checkpoint index tag and processed by the receiving partner based on the tag value.

According to one aspect of the invention, tagged notifications are processed when the value of the tag is current with respect to a current synchronization checkpoint tag value and a synchronization is not in process with the sending partner.

According to another aspect of the invention, notifications are queued when a synchronization is in process with the sender of the notification and the tag value of the notification is compared to the desired synchronization level. The queued notifications are later processed.

According to yet another aspect of the present invention, tagged notifications that are out-of-date may be discarded. For example, if a notification has a tag value indicating it has already been handled from a prior synchronization, it is discarded. Similarly, notifications caused by an ongoing synchronization may be ignored.

DETAILED DESCRIPTION OF THE PREFERRED EMBODIMENT

The present invention is directed at providing a method and system for processing notifications. Briefly described, notifications are tagged with a synchronization key indicating a synchronization state before being sent. The receiving device determines its current synchronization state with respect to the sender and compares the state to the received tagged notification. The receiving device then processes the tagged notification based on this comparison.

Figure 1:
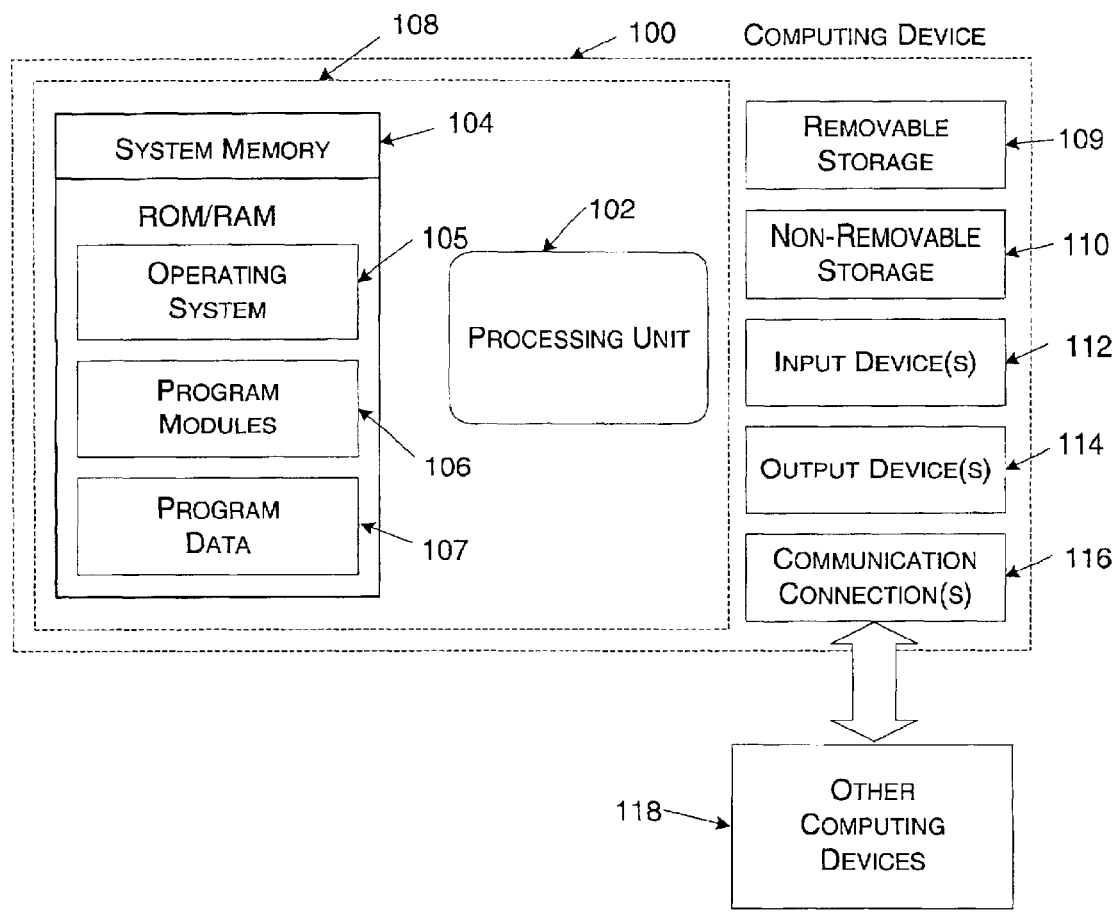
FIG. 1 is a functional block diagram of one computing device adapted to implement one embodiment of the invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
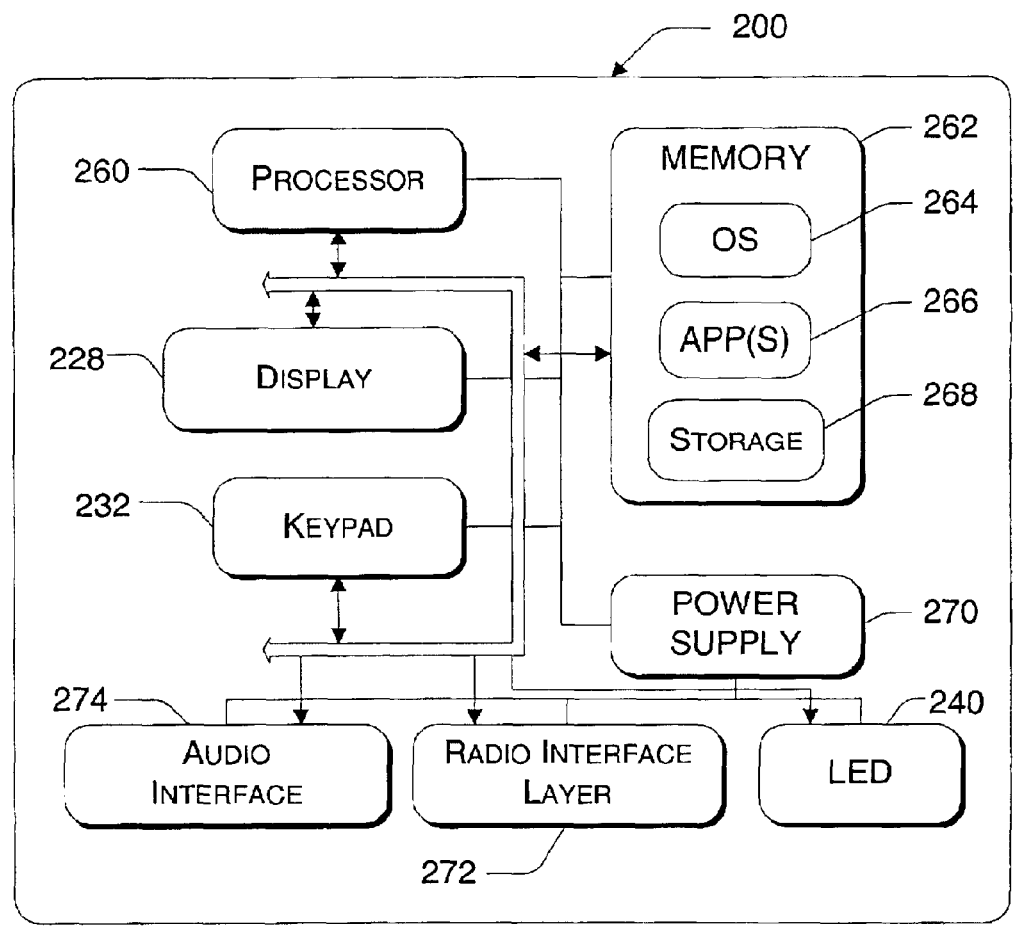
FIG. 2 illustrates a mobile computing device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes nonvolatile storage 268 within the memory 262. The nonvolatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like. A notification application also resides on the mobile computing device 200 and is programmed to process incoming notifications and send outgoing notifications that are tagged with a synchronization state.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Figure 3:
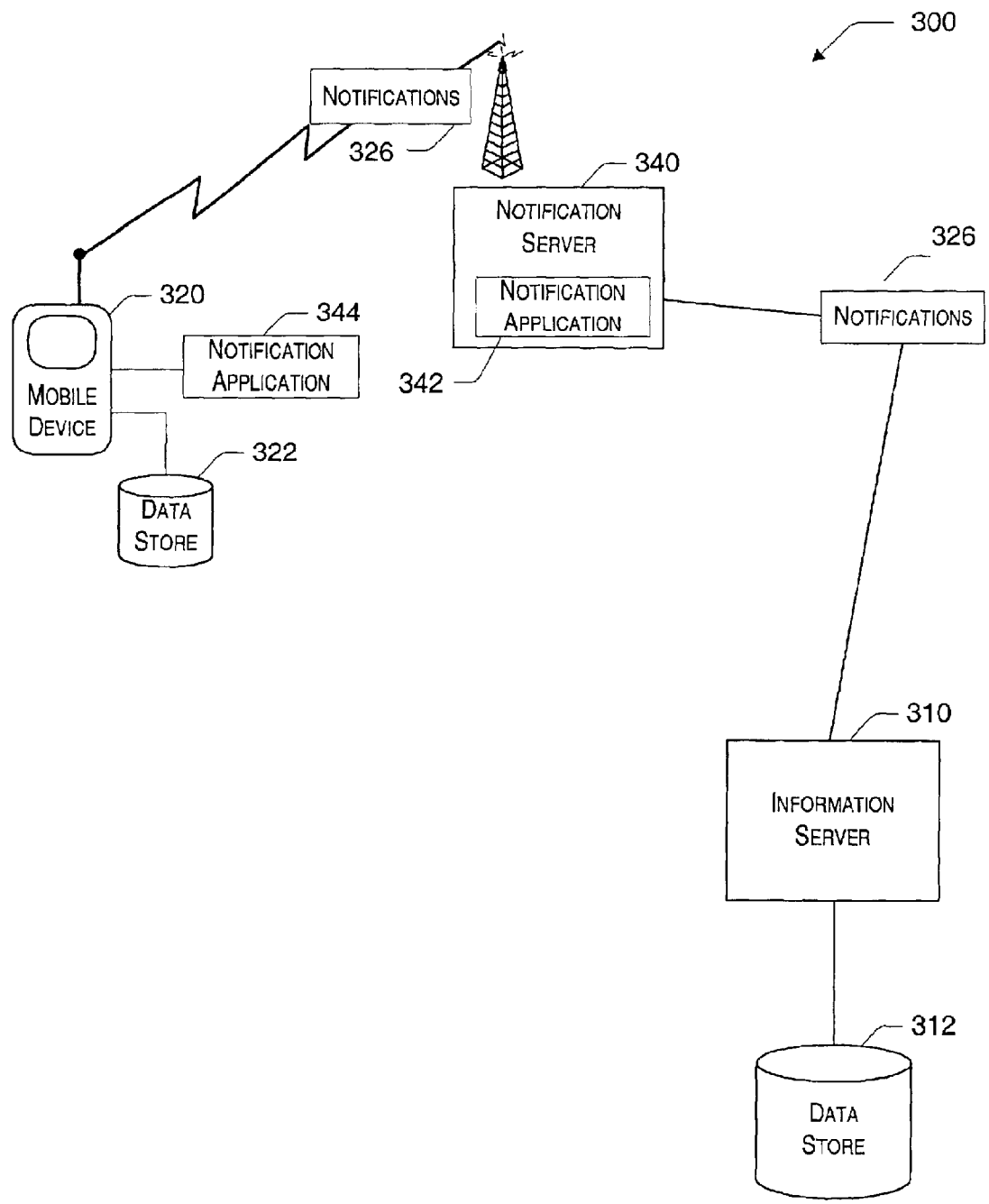
FIG. 3 is a functional block diagram of one exemplary notification system as implemented using the computer device shown in FIG. 1 and the mobile computing device shown in FIG. 2.

FIG. 3 is a functional block diagram generally illustrating one embodiment for a notification system 300 for processing notifications sent and received between a fixed computing device, such as an information server 310 and a mobile device 320, in accordance with the present invention. In this implementation, the information server 310 is a computing device such as the one described above in conjunction with FIG. 1, and the mobile device 320 is a mobile computing device such as the one described above in conjunction with FIG. 2. A notification application 342 performs the notification process between the information server 310 and the mobile device 320. In the embodiment illustrated, notification applications 342 and 344 are resident on a notification server 340 and mobile device 320. In another embodiment, the notification application 342 may reside on information server 310.

The mobile device 320 maintains mobile data 322 locally in its storage 268 (shown in FIG. 2). As mentioned earlier, the mobile data 322 may include e-mail or other messages used by an e-mail application, contact information used by a PIM, appointment information used by a scheduling program, and the like. The mobile device 320 may change the mobile data 322 at anytime. Once the mobile data 322 is changed, server data 312 accessible by the information server 310 will not reflect the mobile data 322 until a successful synchronization occurs. Similarly, the information server 310 may change the server data 312, such as through any number of networked personal computers (not shown) connected to the information server 310. In order for the mobile data 322 and the server data 312 to become identical (i.e., synchronized), the mobile device 320 initiates a synchronization session. During the synchronization session, the mobile device 320 and the information server 310 exchange change information from the last synchronization checkpoint and update their respective stores. In this embodiment, the server can also update the mobile device 320 as changes are made to the data store 312, without the mobile device 320 having to connect to the Information Server 310 and performing a synchronization. This is done by the notification application 342 sending notifications 326 wirelessly to the device when the change occurs, the notification either containing the change information itself, or merely indication that a change has occurred and the mobile device should connect and perform a synchronization.

The notifications 326 are tagged with synchronization information relating to the synchronization states of mobile device 320 and information server 310 before being sent. The mobile device 320 processes the received notification 326 based on the tagged value applied to the notification.

Figure 4:
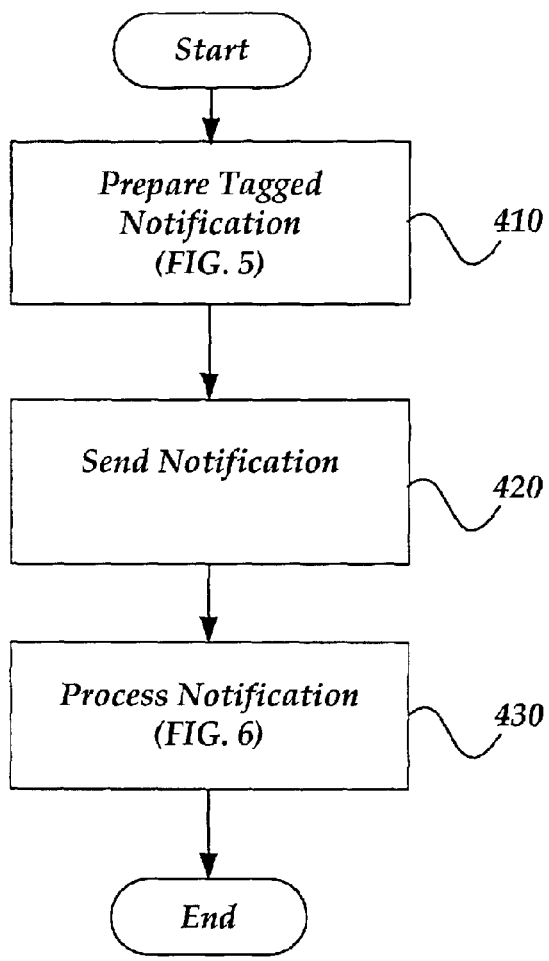
FIG. 4 is an overview flowchart illustrating the use of tagged notifications.

FIG. 4 is an overview flowchart illustrating a notification system. After a start block, the logic moves to a block 410 where notifications are tagged and prepared for sending to a partner (See FIG. 5 and related discussion). Notifications are messages sent to a device as the changes occur and are received by a device independent of any synchronization process. According to one embodiment of the present invention, a wireless device receives tagged notifications indicating a synchronization state. Moving to a block 420, the tagged notification is sent to the receiving device(s). Generally, a server sends the tagged notifications to a client. Alternatively, the client may send tagged notifications to the server. The notifications may be sent to the client or server using many different methods, as is well known to those of ordinary skill in the art. At a block 430, the receiving device processes the tagged notification. Generally, tagged notifications that are current with respect to the synchronization between the client and server are processed, old notifications are deleted, and future notifications are queued (See FIG. 7 and related discussion). The logical flow then ends.

Figure 5:
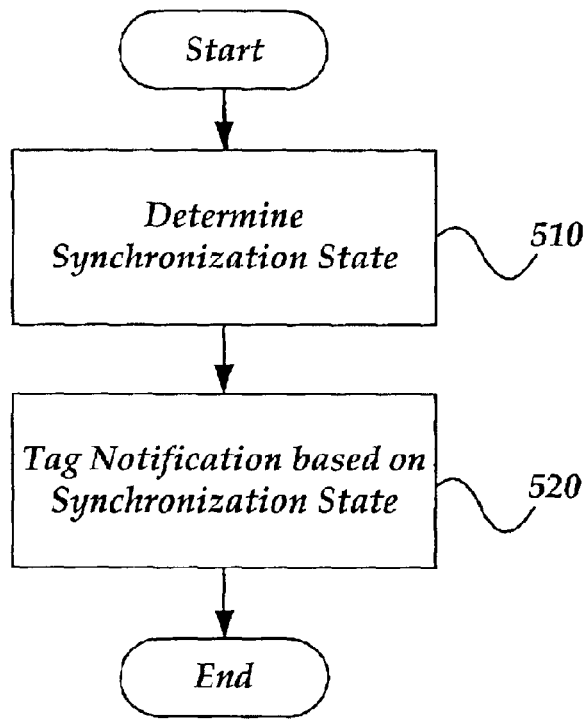
FIG. 5 illustrates a logical flow for preparing tagged notifications.

FIG. 5 shows a logical flow for preparing tagged notifications according to one embodiment of the invention. Starting at a block 510, a synchronization state between the devices is determined. According to one particular embodiment, a synchronization key is used to determine the current synchronization state between the device and the server. The synchronization key is a key as described in co-pending patent application, filed on the same day as this application, Ser. No. 09/892,679, originally entitled "Method and System for Using a Sync Key," by Thomas et al, which is incorporated herein by reference. Briefly described, the sync key is an integer that starts at zero and is incremented with each successful synchronization with the synchronization partner. When the devices have the same sync key value the devices agree on the last synchronization checkpoint. To synchronize to another checkpoint, a device sends the sync key last sent to it by the synchronization partner. For example, if each device is at synchronization level four, and a device desires to synchronize to level five, the device sends the sync key having a value of four to the synchronization partner. According to one embodiment of the invention, the desired synchronization value is the last received synchronization key value received by the synchronization partner. When a synchronization is not being performed, the desired synchronization value will have the same value as the last successful synchronization. Moving to a block 520, the notification that will be sent to the receiving partner is tagged with the current synchronization value. For example, if the last synchronization value received from the device was five and a successful response was sent to the device with that value, then the notification is tagged with a value of five. The logical flow then ends.

Figure 6:
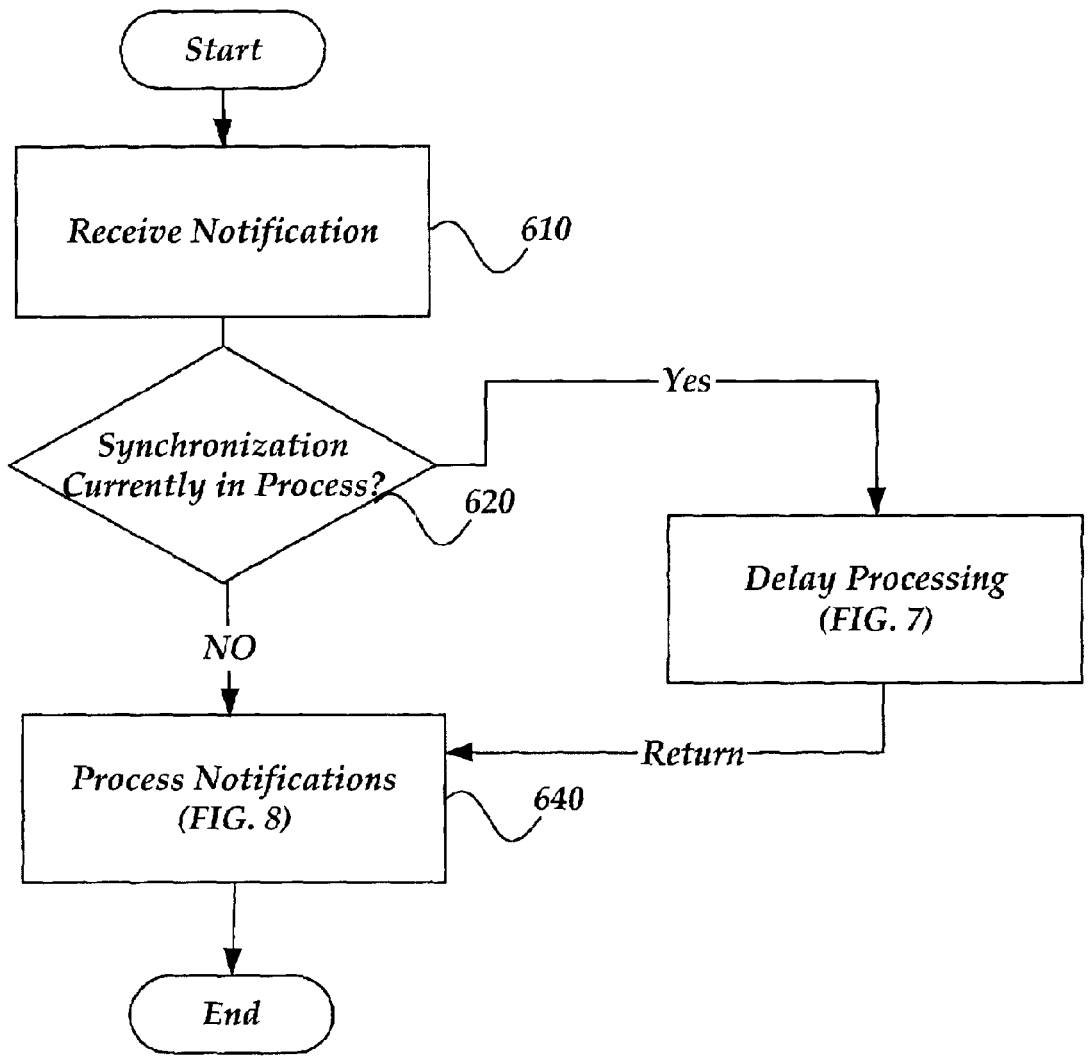
FIG. 6 shows a logical flow for processing tagged notifications.

FIG. 6 illustrates a logical flow for processing a tagged notification, according to an embodiment of the invention. After a start block, the logical flow moves to a block 610, where a notification is received. Moving to a decision block 620, a determination is made as to whether a synchronization is currently in process. When a synchronization is currently in process, the logical flow moves to a block 630, at which point the processing of the notification is delayed (See FIG. 7 and related discussion). When a synchronization is not currently in process, the logical flow moves to a block 620, where the notification is processed (See FIG. 8 and related discussion). The logical flow then ends.

Figure 7:
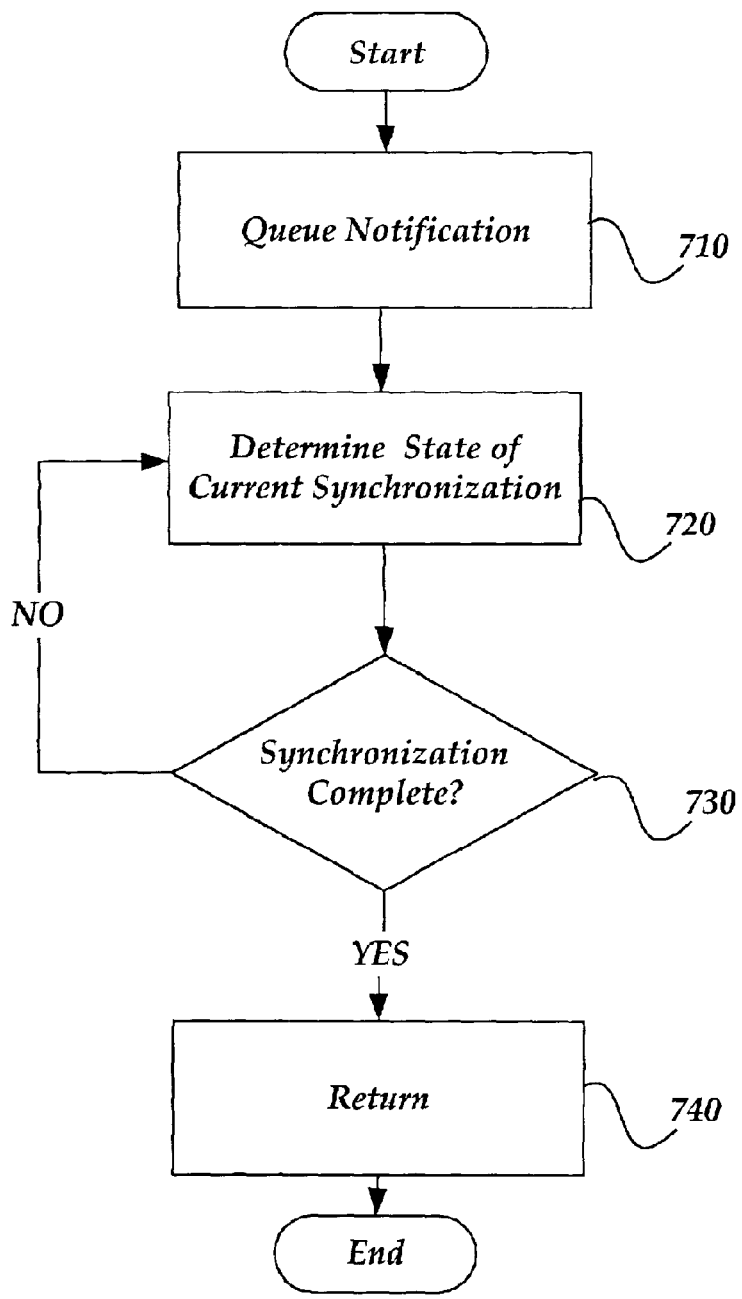
FIG. 7 illustrates handling a notification when a synchronization is currently in process.

FIG. 7 illustrates handling a notification when a synchronization is currently in process, according to one embodiment of the invention. After a start block, the logical flow moves to a block 710, at which point the notification is queued. Transitioning to a block 720, a determination is made as to whether the current synchronization is complete. Decision block 730 determines if the synchronization is complete. If the synchronization is complete, the logical flow returns to process the notification (See FIGS. 6 and 8 and related discussion). If the synchronization is not complete, the logical flow returns to determination block 720. The logical flow then ends.

Figure 8:
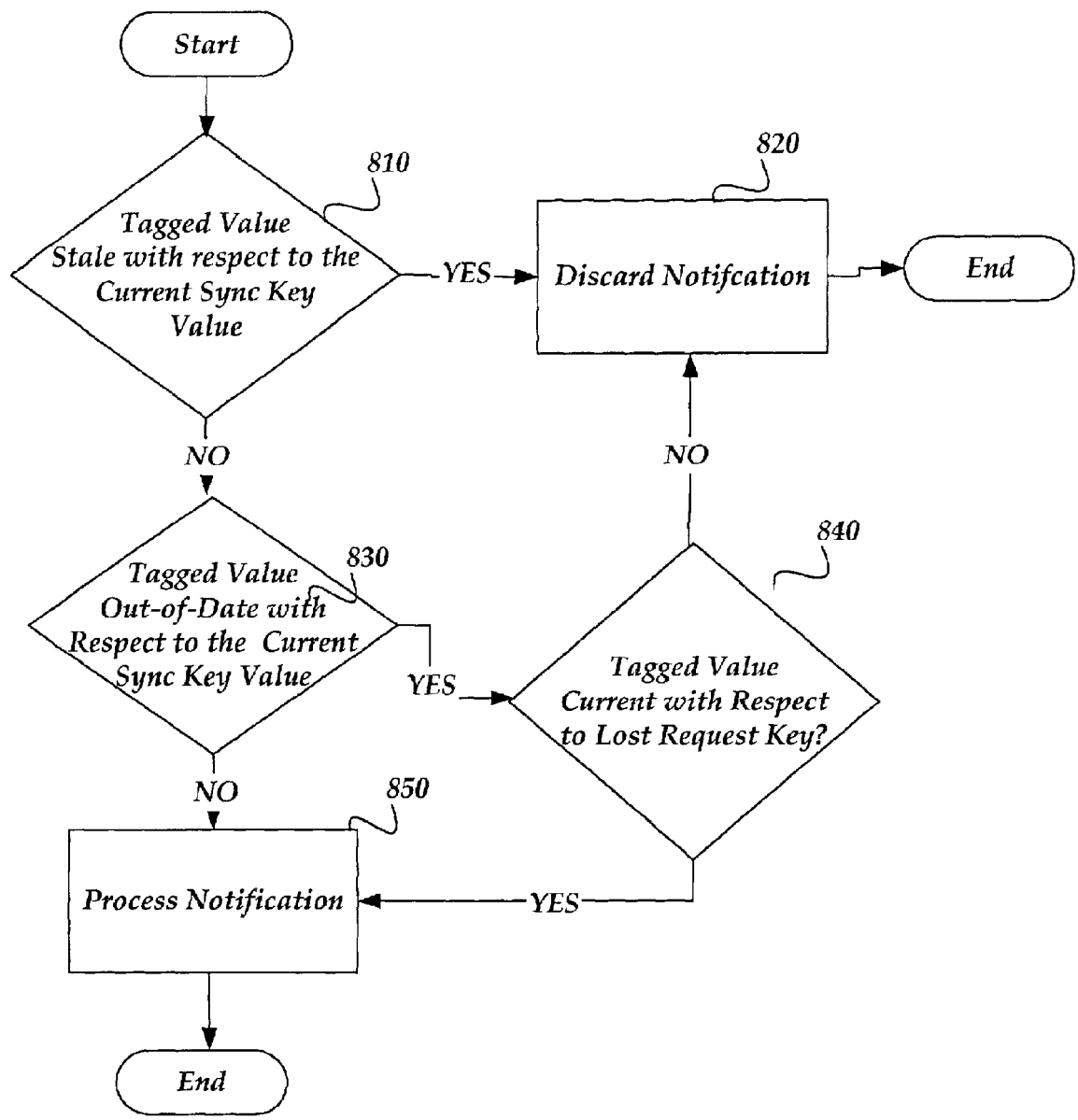
FIG. 8 illustrates a logical flow for processing notifications.

FIG. 8 shows a logical flow for processing notifications. After a start block, the logical flow moves to a decision block 810, where a determination is made if the tagged value is stale with respect to the current synchronization key. According to one embodiment of the invention, the tagged value is stale if the tagged value is less than the current synchronization key value. If so, the logical flow moves to a block 820.

At block 820, the notification is discarded, and the logical flow ends. When the tagged value is not stale with respect to the current sync key value, the logical flow moves to a decision block 830.

At decision block 830, the logic determines if the tagged value is out-of-date with respect to the current sync key value. According to one embodiment of the invention, the notification is out-of-date if the tagged value is larger than the current sync key value.

If so, the logical flow transitions to a decision block 840 that determines if the notification is current with respect to a lost request sync key. According to one embodiment, the tagged value is current with respect to a lost request sync key if the tagged value is equal to a lost request sync key. If the response to the last synchronization request sent by the device was not received and the synchronization key for that request is equal to the tagged value to the notification, the notification can be used and the logical flow moves to a block 850. Otherwise, the logic moves to a block 820, and the notification is discarded.

When the tagged value is not out-of-date with respect to the current sync key value, the logical flow moves to a block 850, where the notification is processed. According to this situation, the notification is current. A notification is current when the tag value is equal to the current sync key value. As will be appreciated, in view of the present disclosure, the above logical flow may be performed many different ways. For example, the decision as to whether discard, process, or queue the notification may be done other ways other than by a direct integer comparison. The logical flow then ends.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for processing a notification sent from a sending device to a receiving device, comprising:

receiving the notification that includes a tagged value that indicates a count;

receiving a synchronization key from the sending device;

determining a current synchronization stale by comparing the received synchronization key to a stored synchronization key, wherein the synchronization state of the receiving device and the synchronization state of the sending device are at a desired synchronization level when the received synchronization key has the same value as the stored synchronization key;

setting a synchronization currently in process state when a synchronization is in process;

setting a synchronization currently not in process state when synchronization is not in process;

generating a current synchronization checkpoint count value based on the current synchronization state;

comparing the count of the tagged value to the current synchronization checkpoint count value; and processing the notification when the count of the tagged value is current with respect to the current synchronization checkpoint count value, otherwise managing the notification.

2. The method of claim 1, wherein managing the notification further comprises determining when the current synchronization state is set to the synchronization currently in process state, and when:
discarding the notification when the count of the tagged value is stale with respect to the current synchronization checkpoint count value; and
handling the notification when the count of the tagged value is out-of-date with respect to the current synchronization checkpoint count value.

3. The method of claim 2, wherein handling the notification when the count of the tagged value is out-of-date with respect to the current synchronization checkpoint count value, further comprises determining if the count of the tagged value corresponds to a lost request key, and if so processing the notification, otherwise discarding the notification.

4. The method of claim 1, wherein processing the notification further comprises determining when the synchronization currently in process state is set, and when:
queuing the notification when the count of the tagged value is current with respect to the desired synchronization level;
discarding the notification when the count of the tagged value is stale with respect to the desired synchronization level or out-of-date with respect to the desired synchronization level and corresponds to a sync level of a lost sync request; and
handling the notification when the count of the tagged value is out-of-date with respect to the desired synchronization level.

5. The method of claim 4, further comprising processing the notification when the synchronization currently not in process state is set.

6. A computer-readable medium having computer-executable instructions for processing a notification sent from a sending device to a receiving device, comprising:
receiving the notification that includes a tagged value that indicates a count;
receiving a synchronization key from the sending device;
determining a current synchronization state by comparing the received synchronization key to a stored synchronization key, wherein the synchronization state of the receiving device and the synchronization state of the sending device are at a desired synchronization level when the received synchronization key has the same value as the stored synchronization key;
setting a synchronization currently in process state when a synchronization is in process;
setting a synchronization currently not in process state when a synchronization is not in process;
generating a current synchronization checkpoint count value based on the current synchronization state;
comparing the count of the tagged value to the current synchronization checkpoint count value; and
processing the notification when the count of the tagged value is current with respect to the current synchronization checkpoint count value, otherwise managing the notification.

7. The computer-readable medium of claim 6, wherein managing the notification further comprises determining when the current synchronization state is set to the synchronization currently in process state, and when:
discarding the notification when the count of the tagged value is stale with respect to the current synchronization checkpoint count value; and
handling the notification when the count of the tagged value is out-of-date with respect to the current synchronization checkpoint count value.

8. The computer-readable medium of claim 7, wherein handling the notification when the count of the tagged value is out-of-date with respect to the current synchronization checkpoint count value, further comprises determining if the count of the tagged value is current with respect to a lost request key, and if so processing the notification, otherwise discarding the notification.

9. The computer-readable medium of claim 6, wherein processing the notification further comprises determining when the synchronization currently in process state is set, and if so:
queuing the notification when the count of the tagged value is current with respect to the desired synchronization level;
discarding the notification when the count of the tagged value is stale with respect to the desired synchronization level or out-of-date with respect to the desired synchronization level and current with respect to a sync level of a lost sync request; and
handling the notification when the count of the tagged value is out-of-date with respect to the desired synchronization level.

10. The computer-readable medium of claim 9, further comprising processing the notification when the synchronization currently not in process state is set.

11. A system for synchronizing data, comprising:
a processor and a computer-readable medium;
an operating environment stored on the computer-readable medium and executing on the processor;
a communication connection device operating under the control of the operating environment; and
a notification device operating under the control of the operating environment and operative to perform actions, including:
receiving a notification from a sending device, wherein the notification has a tagged value that indicates a count;
receiving a synchronization key from the sending device;
determining a current synchronization state by comparing the received synchronization key to a stored synchronization key, wherein a desired synchronization value is established with the sending device when the received synchronization key has the same value as the stored synchronization key;
setting the synchronization state to a currently in process state when a synchronization is currently in process, otherwise setting the synchronization state to a synchronization currently not in process state;
processing the notification based on the count of the tagged value and the synchronization state; and
determining when the synchronization state is set to the synchronization currently not in process state.

12. The system of claim 11, wherein when the synchronization state is set to the synchronization currently not in process state, the notification device being further operative to perform actions, including:
processing the notification when the count of the tagged value is current with respect to a current synchronization checkpoint count value;

discarding the notification when the tagged value is stale with respect to the current synchronization checkpoint count value or out-of-date with respect to the desired synchronization value and current with a lost sync request; and handling the notification when the count of the tagged value is out-of-date with respect to the current synchronization checkpoint count value.

13. The system of claim 12, wherein handling the notification when the count of the tagged value is out-of-date with respect to the current synchronization checkpoint count value, further comprises determining if the count of the tagged value is current with respect to a lost request key, and if so, processing the notification, otherwise discarding the notification.

14. The system of claim 13, wherein processing the notification based on the count of the tagged value and the synchronization state, further comprises determining when the synchronization currently in process state is set, and when:

queuing the notification when the count of the tagged value is current with respect to the desired synchronization value;

discarding the notification when the count of the tagged value is stale with respect to the desired Synchronization value; and handling the notification when the count of the tagged value is out-of-date with respect to the desired synchronization value.

15. The system of claim 14, further comprising processing the notification when the synchronization currently not in process state is set.

* * * * *